Figure 1:
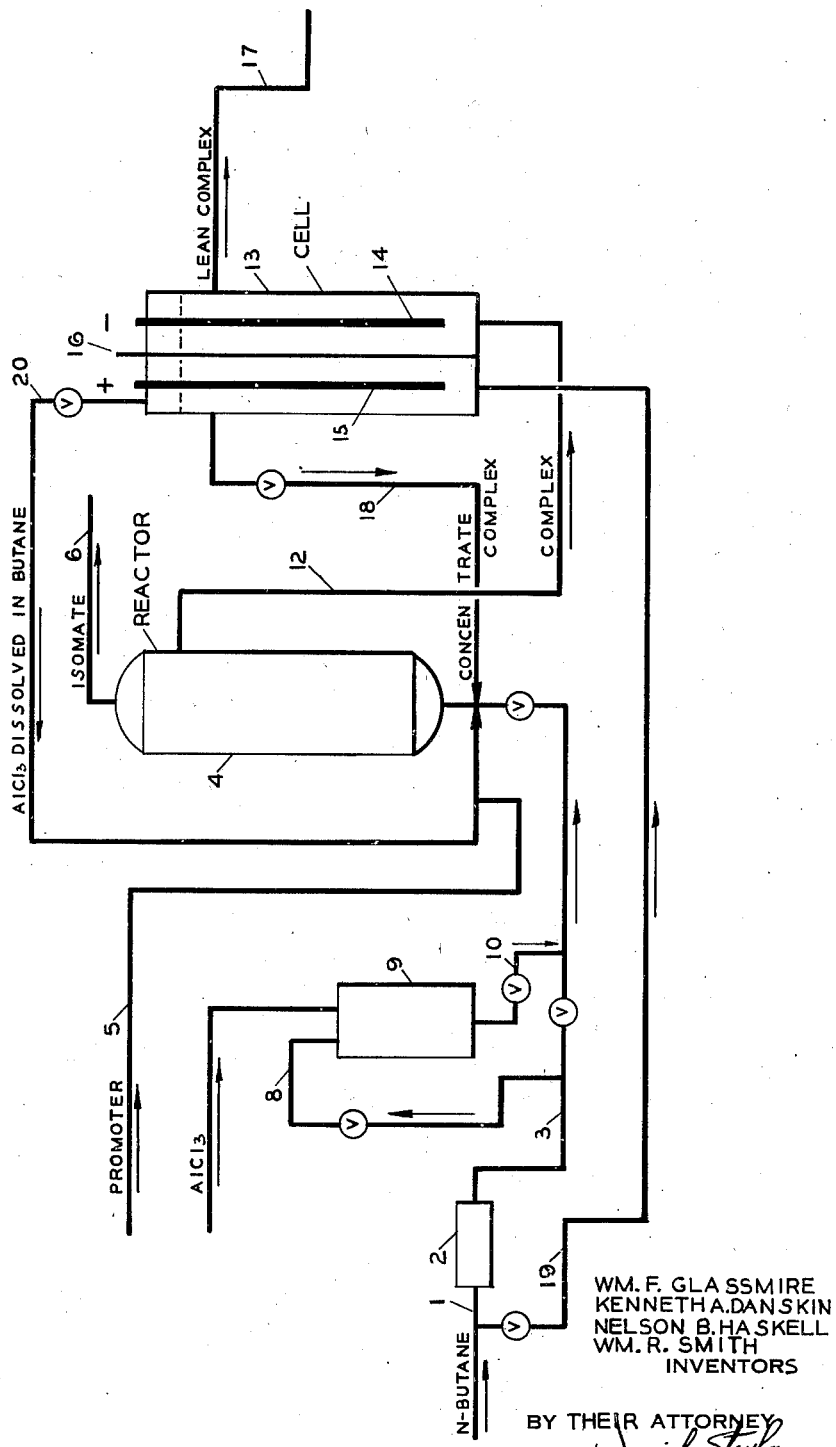

Patented Mar. 8, 1949

2,463,610

UNITED STATES PATENT OFFICE 2,463,610

TREATMENT OF HYDROCARBONS WITH METALLIC HALIDE-HYDROCARBON COMPLEX CATALYSTS

William F. Glassmire, William R. Smith, and Nelson B. Haskell, Port Arthur, Tex., and Kenneth A. Danskin, New York, N. Y., assignors to The Texas Company, New York, N. Y., a corporation of Delaware Application March 1, 1945, Serial No. 580,434

1 Claim. (Cl. 260—683.5)

This invention has to do with the treatment of hydrocarbons with metallic halide-hydrocarbon complex type catalysts involving recovery of metallic halide from used complex catalyst and formation of complex having a predetermined concentration of metallic halide.

The invention has to do with the treatment of hydrocarbons with a Friedel-Crafts type of catalyst such as aluminum halide to effect isomerization, alkylation, polymerization, etc. wherein the catalyst comprises a complex of the anhydrous metallic halide and hydrocarbons, the activity of which depends upon the metallic halide content of the complex catalyst. In accordance with the invention, used complex catalyst is subjected to electrolysis so as to produce therefrom recovered complex of increased metallic halide content or so as to recover metallic halide from the used complex and use it in turn for the fortification of complex catalyst being used in the hydrocarbon conversion reaction.

The invention thus has application to conversion processes such as isomerization or alkylation of petroleum hydrocarbons with an aluminum halide catalyst wherein the catalyst comprises either preformed complex, complex formed in situ, or a mixture of such complexes.

The activity of the catalyst depends upon the content of aluminum halide, and a complex catalyst of high activity therefore contains free aluminum halide dissolved or suspended in complex liquid or contains a substantial amount of aluminum halide in loose chemical combination with hydrocarbons. The heat of hydrolysis of the catalyst provides a method of indicating the activity of the catalyst. This is determined by measuring with a calorimeter the heat evolved upon addition of a weighted sample of complex catalyst to a measured quantity of water.

For example, an aluminum chloride-hydrocarbon complex catalyst effective for isomerizing normal butane is characterized by having an apparent heat of hydrolysis in the range of about 300 to 330 small calories per gram of complex, equivalent to an absolute heat of hydrolysis of about 320 to 352 calories per gram when corrected to include the heat absorbed by the calorimeter employed in the test. Throughout the balance of the specification, whenever the heat of hydrolysis is specified, it will be understood that this refers to the apparent value to which a percentage correction of 6.6% should be added to obtain the absolute value. During continued use, the activity of the complex catalyst declines apparently as a result of aluminum halide disappearance from the complex. Such disappearance may be due in part to solution of aluminum halide in the stream of hydrocarbons undergoing treatment, the dissolved aluminum halide thus escaping in the effluent hydrocarbon stream from the reaction zone.

In order to maintain the activity of the complex catalyst within the reaction zone at a predetermined level, it is customary to add periodically or continuously a small amount of aluminum halide usually as a solution in the feed hydrocarbon stream. The amount so added is regulated to maintain within the reaction zone a complex catalyst characterized by a specified heat of hydrolysis. The forming, in situ, of additional complex as a result of interaction between free aluminum halide and some of the feed hydrocarbons occurs. This results in building up the volume of complex liquid within the reaction zone, thereby necessitating the withdrawal of surplus complex liquid from the reaction zone periodically or continuously in relatively small amount.

The present invention contemplates subjecting the used complex catalyst liquid withdrawn from the reaction zone to electrolysis. This is advantageously accomplished by passing the withdrawn complex liquid to a suitable electrolytic cell wherein the complex is subject to the influence of an electric current flowing between negative and positive electrodes within the cell.

Metallic halide is thus transferred from the liquid in the zone of the negative electrode to the liquid in the zone of the positive electrode. In this way the metallic halide concentration of the complex liquid in the electropositive zone of the cell increases substantially while that of the liquid in the electronegative zone of the cell decreases.

Provision is made for discharging the complex liquid of decreased metallic halide concentration from the electro-negative zone while the complex liquid of increased metallic halide concentration is separately removed from the electro-positive zone of the cell and returned to the conversion reaction zone.

The complex liquid of decreased metallic halide content may be discharged from the system or may be used in a second conversion reaction stage where a catalyst of decreased activity is employed. On the other hand, it may be used as the catalyst in a separate and different conversion reaction wherein a catalyst of lower activity is effective. Thus the invention may be used in conjunction with isomerization and alkylation reaction. In such case complex catalyst discharged from the isomerization reaction is subjected to electrolysis, thereby producing a fortified complex useful for return to the isomerization reaction, and a complex of decreased metallic halide content useful as the catalyst in the alkylation reaction. On the other hand, the fortified complex liquid produced in the electrolytic treatment may be used in the alkylation reaction instead of being recycled to the isomerization reaction. In such case the electrolysis is carried out under conditions to produce fortified complex liquid of predetermined activity suitable for use in the alkylation reaction.

A modification of the invention involves carrying out the electrolysis so as to effect recovery of metallic halide from the electrolytic cell by sublimation. The sublimed aluminum chloride may be used for incorporating in complex liquid in a separate zone or may be disposed of as otherwise desired.

A further modification involves passing a stream of suitable liquid such as normal butane, isobutane, pentanes, or saturated hydrocarbons having from 3 to 5 carbon atoms per molecule through the electropositive zone of the cell during the electrolysis so as to dissolve metallic halide being transferred into that zone from the electronegative zone. The resulting solution is removed from the electrolytic cell and conducted to the conversion reaction zone so that the recovered metallic halide is thus recycled. This modification is advantageously employed in isomerizing normal butane with aluminum chloride. The solvent liquid comprises a portion of the normal butane feed to the isomerization reaction.

In order to describe the invention in more detail, reference will now be made to the figures of the accompanying drawing, both of which illustrate methods for effecting isomerization of a normal paraffin hydrocarbon such as normal butane.

As indicated in Figure 1, normal butane is drawn from a source not shown through a pipe 1 and conducted through a heat exchanger 2, wherein it is heated to a temperature of about 200 to 220° F. and then passed through a pipe 3 to a reactor 4.

The reactor 4 comprises a vertical tower containing a substantial body of complex catalyst formed by reacting aluminum chloride with hydrocarbons.

In starting up the process it may be necessary to use a preformed complex liquid prepared by reacting aluminum chloride with saturated paraffin hydrocarbons such as a kerosene fraction of petroleum. The reaction may be effected at a temperature of about 200° F. in the presence of a small amount of hydrogen chloride. The resulting complex liquid is separated from excess hydrocarbons and may have an additional quantity of aluminum chloride added thereto so as to provide a liquid complex catalyst having a heat of hydrolysis of about 328 calories per gram.

The butane feed in liquid phase rises through the column of complex liquid in the reactor 4, maintained at a temperature of about 200 to 220° F. A small amount of hydrogen chloride promotor is added from a source not shown through a pipe 5.

During passage through the reactor normal butane is converted to isobutane, and the resulting isomate comprising a mixture of isobutane and unreacted normal butane is continuously discharged through a pipe 6. The isomate stream also contains some promoter and will also contain a small amount of dissolved aluminum halide, particularly in operations wherein the complex catalyst has a high heat of hydrolysis, for example above about 330 calories. Therefore, provision, not shown in the drawing, is made for treating the isomate stream to remove these materials therefrom, following which the stream is subjected to conventional fractionation for the purpose of separating isobutane therefrom.

A portion of the normal butane may be diverted through a pipe 8 to a vessel 9, the latter containing solid aluminum chloride in lump form. The diverted butane stream during passage through the vessel 9 dissolves aluminum chloride and the resulting solution is conducted through a pipe 10 to the pipe 3. In this way make-up aluminum chloride is added to the system in order to compensate for that lost from the system.

Since aluminum chloride is being added to the reactor, some complex formation occurs as a result of reaction between aluminum chloride and feed hydrocarbon. Surplus complex liquid is thus drawn off through a pipe 12 to a cell 13. This cell may be of any suitable design and of sufficient capacity to handle the surplus complex liquid. It is provided with electrodes 14 and 15, which may be in the form of parallel plates, preferably formed of carbon, although metals such as iron and aluminum, or other suitable electrode material, may be used.

The cell is provided with a partition 16, which may be porous or which may not extend all the way to the bottom of the cell. Thus, the cell may be in the form of either a U-tube or an H-tube or the equivalent, so as to divide it into electropositive and electronegative zones, the electrode in the electropositive zone being a positive pole, while that in the electronegative zone is a negative pole. The electrodes are thus in electric communication with a suitable source of direct current.

The pipe 12 communicates with the electronegative zone of the cell and the complex liquid introduced to the cell has imposed upon it an electrical current which may be in the range of about 0.5 to 5.0 amperes. The voltage required will depend on the size of the apparatus and the materials used in its construction.

The complex liquid entering the cell from the pipe 12 may be characterized by a heat of hydrolysis of about 324 calories or less and that portion of it rising through the electronegative zone of the cell declines in aluminum chloride content until it may be characterized by a heat of hydrolysis of about 300 calories or less. This resulting lean complex is withdrawn through a pipe 17 and thus discharged from the cell either continuously or intermittently.

The portion of the complex liquid rising through the electropositive zone of the cell increases in aluminum chloride concentration until it is characterized by a heat of hydrolysis of about 342 calories. It is continuously or intermittently withdrawn as concentrated complex through a pipe 18 which advantageously communicates with the pipe 3 leading to the bottom portion of the reactor 4 and is in this way recycled to the reactor.

If desired, a portion of the butane feed is diverted from the pipe 1 through a pipe 19 and introduced to the lower portion of the electropositive zone of the cell and caused to flow upwardly therethrough, effecting solution of aluminum chloride being transferred into this zone of the cell. The resulting solution of aluminum chloride in normal butane is removed from the upper portion of the cell through a pipe 20 and advantageously recycled to the reactor 4 as indicated.

Thus, the amount of aluminum chloride added as make-up from the vessel 9 is that necessary to compensate for aluminum chloride being removed from the system in the form of lean complex discharged through the pipe 17, as well as any that may be otherwise lost from the system, as for example in the isomate stream.

Figure 2:
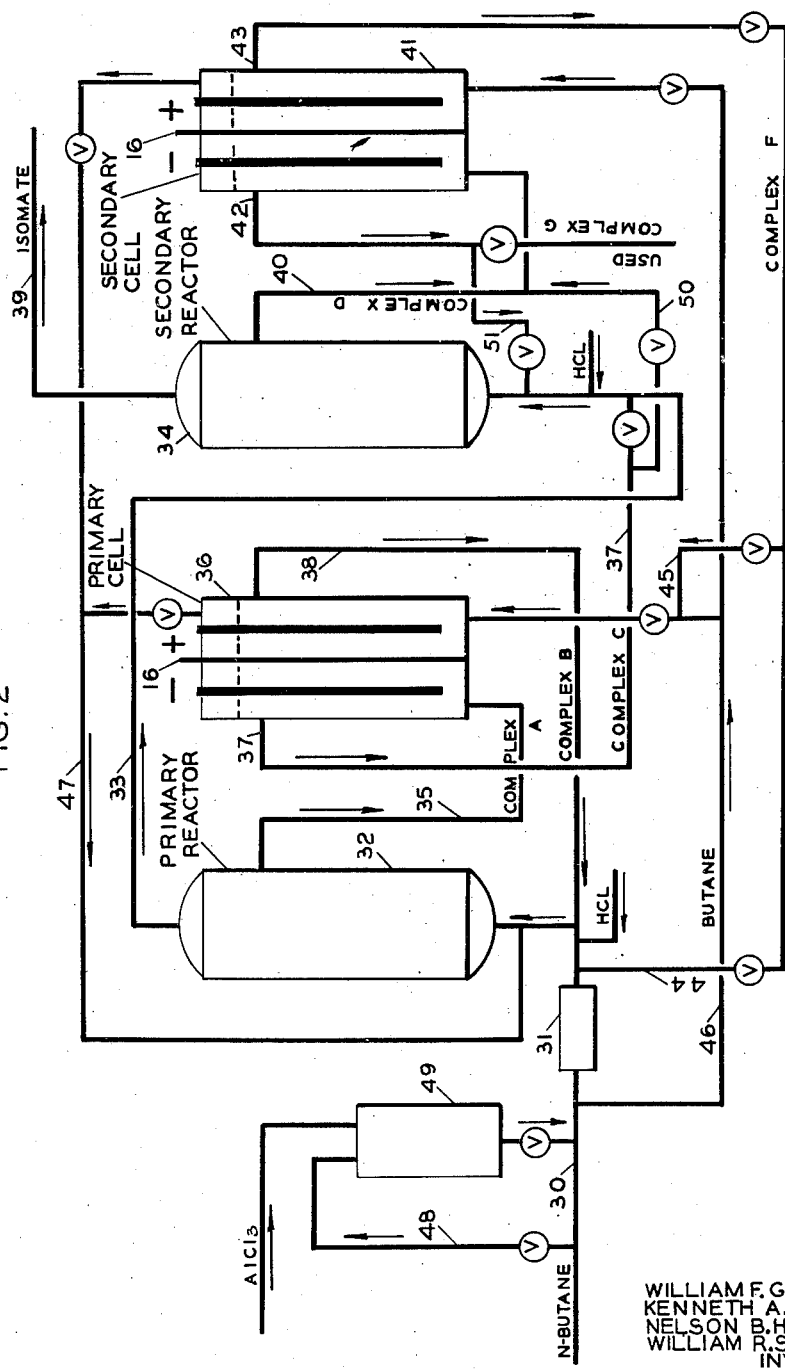

Figure 2 illustrates a two-stage process for isomerizing normal butane. Thus, normal butane is conducted from a source not shown through a pipe 30 and a heater 31 to a reactor 32, the latter being substantially similar to reactor 4 of Figure 1. The effluent stream of reacted hydrocarbons is continuously discharged from the top of the reactor through a pipe 33 which leads to the bottom of a secondary reactor 34.

Both reactors 32 and 34 contain a body of complex liquid catalyst such as referred to in connection with Figure 1.

The surplus complex A from the primary reactor is drawn off through a pipe 35 to a primary cell 36. Complex A is subjected to electrolysis therein forming a lean complex C which is discharged therefrom through a pipe 37 leading to the lower portion of the secondary reactor 34. Thus the secondary reactor is supplied with complex of relatively low activity, for example having a heat of hydrolysis of around 300 as compared with the complex of higher activity; namely, about 330 calories in the primary reactor.

Fortified complex B is discharged from the cell 36 through a pipe 38 and recycled to the primary reactor 32.

The partially converted normal butane feed rises through the reactor 34 and is discharged therefrom through a pipe 39.

Used or surplus complex D from the reactor 34 is discharged through a pipe 40 which leads to the lower portion of a secondary cell 41 wherein it undergoes electrolysis.

Used complex G of low activity, for example of about 280 calories, is discharged through a pipe 42 and removed from the system. Reconcentrated complex F is discharged from the cell 41 through a pipe 43 and may be recycled through a pipe 44 to the primary reactor 32 all or in part. On the other hand, it may be recycled all or in part through pipe 45 to the primary cell 36 for further concentration.

As in the case of Figure 1, provision may be made for diverting a portion of the normal butane stream through a pipe 46 to the electropositive zones of the primary and secondary cells to effect solution of aluminum chloride. The resulting solution is removed from the upper portions of the cells and recycled through a pipe 47 to the inlet of the primary reactor. Likewise, provision is made for adding the required amount of make-up aluminum chloride by diverting a small stream of feed butane through a pipe 48 to an aluminum chloride solution vessel 49, the resulting solution being added to the feed stream passing to the heater 31.

In carrying out the process of Figure 2 the primary reactor may be maintained at a temperature of about 200° to 210° F. while that in the secondary reactor is maintained at about the same temperature or at a somewhat lower temperature so as to reduce the solubility of aluminum chloride in the effluent hydrocarbon stream. The primary reactor is operated so as to maintain a high level of hydrocarbon conversion, using a catalyst having a heat of hydrolysis as high as 340 calories, for example. The complex in the secondary reactor, being about 220 to 280 calories, will absorb aluminum chloride carried over in the hydrocarbon stream from the primary reactor.

The temperatures maintained in the electrolytic cells may range from about 100 to 200 or 220° F. and preferably not in excess of about 300° F. Also, the cells may be operated under pressures ranging from atmospheric to about 500 pounds per square inch.

The temperatures maintained in the electrolytic cells may be sufficiently high to permit substantial sublimation of aluminum chloride from the positive portion of the cells. It is contemplated that removal of the aluminum chloride in this way may be facilitated by operating the cells at reduced pressure and at elevated temperature. Also, if desired, a carrier gas may be passed through the complex contained in the cell while at the aforesaid temperatures to further assist in removing the aluminum chloride. The gas may be hydrogen, nitrogen, hydrogen chloride or any other gas inert to aluminum chloride. A gas such as chlorine may be employed as the carrier, particularly if the complex is deficient in chlorine.

While the drawing describes the invention with specific reference to the isomerization of normal butane, it will be understood that the invention is applicable to the isomerization of other normal paraffin hydrocarbons and saturated hydrocarbons such as low boiling naphthenes. Also, as previously mentioned, the invention is applicable to conversion reactions other than isomerization, as for example alkylation wherein a low boiling isoparaffin such as isobutane is reacted with a low boiling olefin such as the butylenes.

It is also contemplated that instead of employing a separate electrolytic zone, the electrolysis reaction may be carried out within the conversion reaction zone. Thus, electrodes may be placed at the top and bottom of the reactor, the bottom electrode being positive. In this way, complex of high activity is maintained in the lower portion of the reactor while complex of lower activity is maintained in the upper portion.

It is also contemplated that the method of flow illustrated in Figure 2 may be modified so that the complex C from the primary cell 36 may be passed directly to the secondary cell 41 through a branch pipe 50. In this event the complex G from the secondary cell 41 is passed all, or in part, through branch pipe 51 to the secondary reactor 34, the object as previously indicated being to maintain the heat of hydrolysis in the secondary reactor at a value not exceeding about 300 calories per gram of complex.

Other metallic halides besides aluminum chloride and aluminum halides may be used such as zinc halides.

Concentration of the halide may be effected in single or plural stage operations. The used complex may be processed in a plural stage system comprising a series of 3 or more cells. For example, a used complex of about 280 calories per gram (heat of hydrolysis) may be charged to a cell 3 in a series of cells. From the electropositive side of cell 3 is withdrawn complex of about 300 calories per gram while from the negative side is withdrawn complex of about 260 calories per gram. The 300 calories per gram complex is passed to cell 2 in the series and there converted into 320 calories per gram complex and 280 calories per gram complex. The 320 calories per gram complex is passed to cell 1 while the 280 calories per gram complex is passed to cell 3. This operation may be continued through as many cells as desired to recover from one end of the series a highly "fortified" complex and from the other end of the series a complex low in halide content which may be discarded.

Obviously many modifications and variations of the invention as above set forth may be made without departing from the spirit and scope thereof, and therefore only such limitations should be imposed as are indicated in the appended claim.

We claim:

In the isomerization of normal butane, wherein a normal butane feed stream is passed in liquid phase in contact in a reaction zone with a body of aluminum chloride-paraffin hydrocarbon complex liquid containing uncombined aluminum chloride under conditions effecting substantial conversion of normal butane to isobutane, a resulting isomate stream is removed from the reaction zone, additional free aluminum chloride is added to the reaction zone as the operation proceeds, and used complex liquid containing uncombined aluminum chloride is removed from said reaction zone, the method which comprises passing the removed complex liquid containing uncombined aluminum chloride to a zone of electrolysis, under conditions producing migration of aluminum chloride from the electronegative to the electropositive portion of said zone, thereby forming in the electropositive portion complex liquid of increased uncombined aluminum chloride content while leaving in the electronegative portion lean complex liquid of lowered aluminum chloride content, discharging lean complex from said electronegative portion, by-passing a portion of the normal butane feed stream through the said electropositive portion to effect solution of uncombined aluminum chloride in said bypassed normal butane, and conducting the resulting solution of aluminum chloride in normal butane to the reaction zone.

WILLIAM F. GLASSMIRE.
WILLIAM R. SMITH.
NELSON B. HASKELL.
KENNETH A. DANSKIN.

REFERENCES CITED

The following references are of record in the file of this patent:

UNITED STATES PATENTS

| Number | Name | Date |
|---|---|---|
| 2,209,981 | Keyl et al. | Aug. 6, 1940 |
| 2,378,733 | Sensel | June 19, 1945 |
| 2,378,734 | Kiersted, Jr. | June 19, 1945 |
| 2,381,439 | d'Ouville et al. | Aug. 7, 1945 |

OTHER REFERENCES

Neminskii et al., article abstracted in Chemical Abstracts, vol. 3, page 1147 (1909).

"Elektrochemie Nichtwassriger Losungen," by Walden (1924) page 178.

"Applied and Theoretical Electrochemistry," by Thompson, published in 1925, pp. 19, 20.